United States Patent [19]

Centen et al.

[11] Patent Number: 5,739,855
[45] Date of Patent: Apr. 14, 1998

[54] OPTICAL LOW-PASS FILTERING

[75] Inventors: Petrus G. M. Centen; Franciscus P. Van De Weegen; Pieter P. Brouwer, all of Breda, Netherlands

[73] Assignee: U.S. Philips Corporation, New York, N.Y.

[21] Appl. No.: 575,540

[22] Filed: Dec. 20, 1995

[30] Foreign Application Priority Data

Dec. 22, 1994 [EP] European Pat. Off. .............. 94203721

[51] Int. Cl.$^6$ .............................. H04N 5/225; G02B 5/30
[52] U.S. Cl. ................................. 348/342; 359/497
[58] Field of Search ....................... 359/494, 497, 498; 348/360, 336, 337, 262, 342, 612, 630, 708, 711

[56] References Cited

U.S. PATENT DOCUMENTS

| | | | |
|---|---|---|---|
| 3,558,224 | 1/1971 | Murgas et al. | 355/51 |
| 4,743,100 | 5/1988 | Nakada et al. | 350/403 |
| 5,069,530 | 12/1991 | Nishida et al. | 359/498 |
| 5,452,129 | 9/1995 | Shiraishi | 359/497 |
| 5,471,343 | 11/1995 | Takasugi | 359/494 |
| 5,477,381 | 12/1995 | Sasaki et al. | 359/497 |

FOREIGN PATENT DOCUMENTS

| | | | |
|---|---|---|---|
| 0384701 | 8/1990 | European Pat. Off. | H04N 5/335 |
| 0384701A2 | 8/1990 | European Pat. Off. | |
| 0449325A2 | 10/1991 | European Pat. Off. | |
| 60-164719 | 8/1985 | Japan . | |

*Primary Examiner*—Andrew Faile
*Assistant Examiner*—Jacqueline B. Wilson
*Attorney, Agent, or Firm*—Michael E. Belk

[57] ABSTRACT

In a camera including an image sensor (4R, 4G, 4B) having a sampling frequency (fs), and an optical low-pass filter arrangement arranged in an optical path with the image sensor (4R, 4G, 4B), the optical low-pass filter arrangement comprises a first birefringent optical filter element having a frequency response with a frequency trap point at the sampling frequency (fs) of the image sensor (4R, 4G, 4B), and a second birefringent optical filter element having a frequency response with a first frequency trap point at two thirds of the sampling frequency (fs) of the image sensor (4R, 4G, 4B), and a second frequency trap point at twice the sampling frequency (fs) of the image sensor (4R, 4G, 4B).

3 Claims, 2 Drawing Sheets

OPTICAL LOW-PASS FILTERING

BACKGROUND OF THE INVENTION

The invention relates to an optical low-pass filter arrangement, and to a camera comprising such an optical low-pass filter arrangement and an image sensor.

Such an optical low-pass filter arrangement has been described in U.S. Pat. No. 3,558,224, incorporated herein by reference. A series arrangement of three birefringent elements of different thickness with two quarter wave delay elements placed between them constitutes an adjustable bandwidth optical filter. The filter is placed in the light path between an object and the image formed at the photosensitive element of a camera tube. The spatial bandwidth of the light passing through the filter is adjustable in a direction and in the same or different amounts in a plurality of different directions by suitably dimensioning of the birefringent elements and/or by appropriate rotational positioning of the entire filter about its optical axis.

EP-A-0,384,701, incorporated herein by reference, discloses a solid state image pick-up apparatus for picking-up an optical image of an object, including a lens system for forming the optical image of an object, an optical filter for suppressing moiré effects, a colour separation system for separating the optical image into green, red and blue colour images, and three solid state image sensors for receiving the green, red and blue colour images, respectively. An optical image impinging upon the solid state sensor, is spatially sampled along horizontal lines at a sampling frequency fs. The image sampling effected by the sensor causes aliasing or fold-back distortion when the maximum spatial frequency contained in the image is higher than the Nyquist frequency fn, which is equal to a half of the sampling frequency fs. In order to avoid the deterioration in quality of the reproduced image due to fold-back distortion, it is necessary to suppress abruptly spatial frequency components higher than fn without decreasing the response in the frequency range lower than fn. To this end, it has been well known to transmit the optical image of an object through an optical low-pass filter having a trap frequency near fs before sampling the object image by the image sensor. In general, the optical low-pass filter is formed by one or more birefringent quartz plates. The optical filter disclosed in EP-A-0,384,701 has a first quartz plate for separating ordinary and extra-ordinary light rays from each other in a direction of +45° with respect to the horizontal direction, a second quartz plate for separating ordinary and extra-ordinary light rays from each other in the horizontal direction, and a third quartz plate for separating ordinary and extra-ordinary light rays from each other in a direction of −45° with respect to the horizontal scanning direction. The optical filter has two trap points, one at the sampling frequency fs of the image sensor, and the other near 1.5*fs, so that frequency components around fs as well as 2*fs, 3*fs, 4*fs and 5*fs can be suppressed to a large extent, and the suppression for components in the base band can be kept low effectively. However, it appears that the extinction at 2*fs is insufficient, so that aliasing distortion may occur as a result of frequency components present at 2*fs.

As mentioned in EP-A,-0,384,701, JP-A-60/164,719 discloses an optical low-pass filter with three birefringent quartz plates for use in combination with a solid state image sensor. The frequency response curve has two trap points at fn and fs. Such an optical filter has a larger suppression function for frequency ranges near fn and fs than a single quartz plate, but the suppression near fs is not large enough from a practical point of view and the suppression in the base band is so large that desired image components are also reduced and the image quality is deteriorated.

As mentioned in EP-A-0,384,701, JP-A-63/160,849 discloses an optical filter in which components near the sampling frequency are sufficiently suppressed to avoid effectively the generation of the moiré fringes while a decrease in the resolution is avoided by making the suppression in the base band as small as possible. This optical filter comprises three quartz plates for separating ordinary and extraordinary light rays in the incident light at least in the main scanning direction such that the total response characteristic in the main scanning direction has one trap point at or near the sampling frequency, but has no trap point in the frequency range below the sampling frequency. It appears that the optical filter described in this document does not suppress moiré fringes produced at higher harmonics of the sampling frequency fs, for example, 2*fs. In order to reduce such moiré fringes, it is necessary to add an additional quartz plate, making the whole construction of the optical filter complicated and large, and increasing the cost of the optical filter.

EP-A-0,449,325 discloses a video camera equipped with an optical low-pass filter which is to be arranged in front of a solid state imaging device. The optical low-pass filter is suitable for a solid state imaging device in which the sampling pitch (ph) in the horizontal direction is smaller than the sampling pitch (pv) in the vertical direction. For example, ph=pv/1.17. The optical low-pass filter comprises three birefringent plates having respective thicknesses d1, d2 and d3 which are determined such that desirable frequency characteristics in the horizontal and vertical directions can be obtained. In a given example, d1=d3=(2√2 * pv)/3 and d2=ph/2. The first and third birefringent plates, whose thicknesses d1 and d3 have thus been chosen as a function of the sampling pitch pv in the vertical direction, appear to provide a horizontal frequency response with a trap point at 0.64 times the horizontal sampling frequency. The second plate, whose thickness d2 has been chosen as a function of the sampling pitch ph in the horizontal direction, appears to provide a horizontal frequency response with a trap point at the sampling frequency. While a good suppression of frequency components between 0.5*fs and fs is obtained, frequency components around 2*fs (which fold back into very visible low-frequency components) appear to be insufficiently suppressed.

SUMMARY OF THE INVENTION

It is, inter alia, an object of the invention to provide a simple and inexpensive optical low-pass filter arrangement having a frequency response which has trap points at the sampling frequency fs and at twice the sampling frequency fs. To this end, a first aspect of the invention provides an optical low-pass filter arrangement comprising:

a first birefringent optical filter element for providing a frequency response with a frequency trap point at a sampling frequency (fs) of an image sensor to be arranged in an optical path including the optical low-pass filter arrangement and the image sensor; and a second birefringent optical filter element for providing a frequency response with a first frequency trap point at two thirds of the sampling frequency (fs) of the image sensor, and a second frequency trap point at twice the sampling frequency (fs) of the image sensor.

A second aspect of the invention provides a camera comprising such an optical low-pass filter arrangement and image sensor, as defined in claim 2. An advantageous embodiment is defined in claim 3.

The combination of a first optical low-pass filter element having a frequency dip at the sampling frequency, and a second optical low-pass filter element having a frequency dip at two thirds of the sampling frequency, appear to yield a better aliasing suppression performance than a prior art arrangement having optical filter elements providing frequency dips at one and three times the sampling frequency, without sacrificing too much resolution. An optical filter element having a first frequency dip at two thirds of the sampling frequency has a second frequency dip at twice the sampling frequency which effectively suppresses aliasing artifacts resulting from frequency components around the latter frequency. The first frequency dip at two thirds of the sampling frequency yields the further advantage that in the frequency band between 0.5*fs and fs a pre-Nyquist filtering is obtained.

These and other aspects of the invention will be apparent from and elucidated with reference to the embodiments described hereinafter.

DETAILED DESCRIPTION OF THE PREFERRED EMBODIMENT

Figure 1:
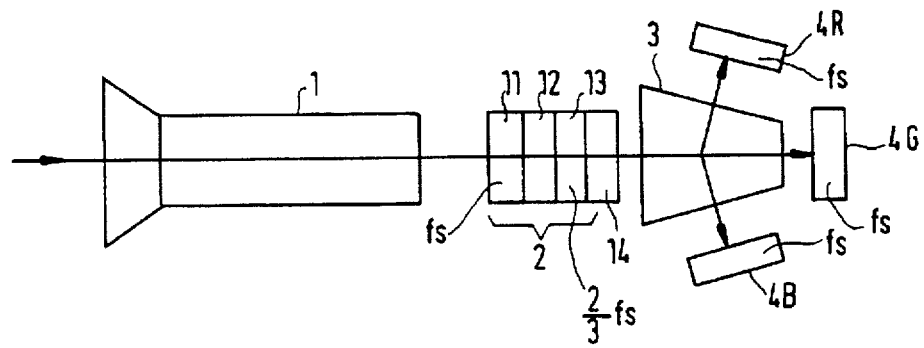
FIG. 1 shows an embodiment of a camera in accordance with the present invention.

FIG. 1 shows an embodiment of a camera in accordance with the present invention, which is basically like the camera known from FIG. 4 of EP-A-0,384,701, incorporated herein by reference. The inventive difference lies in the construction of the optical low-pass filter arrangement 2, as will be described below in more detail. An image of an object to be picked-up is formed by an optical lens system 1 and the image is made incident upon three solid state image sensors (CCD sensors) 4R, 4G and 4B by means of an optical filter arrangement 2 and a colour separation system 3. The colour separation system 3 serves to separate the image of the object into red, green and blue colour images directed into different directions, and the image sensors 4R, 4G and 4B are arranged such that the separated three colour images are made incident upon the respective image sensors. The optical filter arrangement 2 comprises three optical filter elements (e.g. quartz plates) 11, 12 and 13 which are stacked one upon the other. The first birefringent optical filter element 11 provides a frequency dip (or trap point) at the sampling frequency fs of the image sensor. The second optical filter element 12 constitutes a depolarisator or a quarter wave delay element as disclosed in U.S. Pat. No. 3,588,224, incorporated herein by reference. The third birefringent optical filter element 13 provides a first frequency dip at two thirds of the sampling frequency fs of the image sensor, and a second frequency dip at twice the sampling frequency fs.

To neutralize any optical distortions caused by the colour separation system (prism) 3, the optical filter arrangement 2 preferably also comprises a depolarisator 14 between the optical filter element 13 and the prism 3. Such a depolarisator is preferably arranged between the optical filter arrangement 2 and the prism 3 if the optical filter arrangement is placed (in triplicate) between the prism and the three solid state image sensors (CCD sensors) 4R, 4G and 4B.

FIG. 2 schematically illustrates frequency responses of the optical low-pass filter arrangement 2. The horizontal axis indicates the frequency f, the vertical axis indicates the intensity.

Figure 2A:
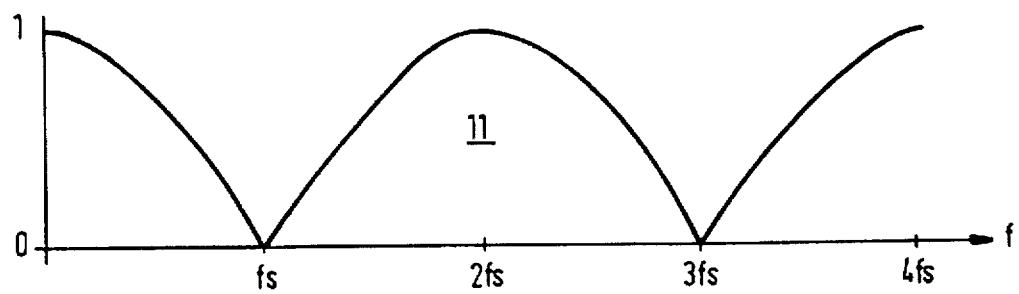
FIG. 2 schematically illustrates a frequency response of an optical low-pass filter arrangement embodiment in accordance with the present invention.

FIG. 2a illustrates the frequency response of the first filter element 11, with frequency trap points at fs and 3*fs. This frequency response can be described by $\cos(\pi/2 * f/fs)$.

The depolarisator 12 has a flat frequency response, not shown.

Figure 2B:
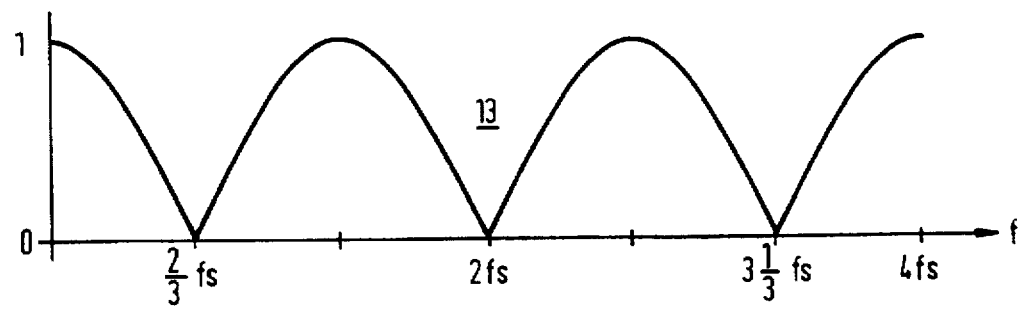

FIG. 2b illustrates the frequency response of the third optical filter element 13, with frequency trap points at ⅔*fs, 2*fs and 3⅓*fs. This frequency response can be described by $\cos(\pi/2 * f/(\frac{2}{3} * fs))$.

Figure 2C:
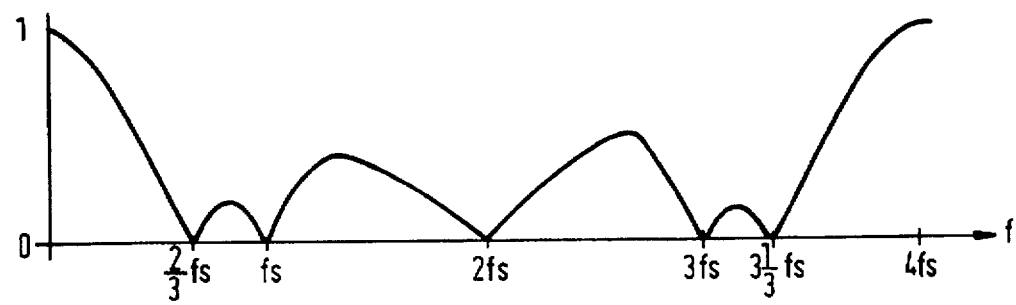

FIG. 2c illustrates the combined effect of the filter elements 11 and 13, with frequency trap points at ⅔*fs, fs, 2*fs, 3*fs and 3⅓*fs. This frequency response can be described by $\cos(\pi/2 * f/fs) * \cos(\pi/2 * f/(\frac{2}{3} * fs))$. As desired, in the overall frequency response trap points at fs and 2*fs are present, while in addition a suppression of frequency components between 0.5*fs and fs is obtained which constitutes a desired pre-Nyquist filtering.

FIG. 3 shows the frequency response of remaining aliasing components. The horizontal axis indicates the frequency f, the vertical axis indicates the intensity.

Figure 3A:
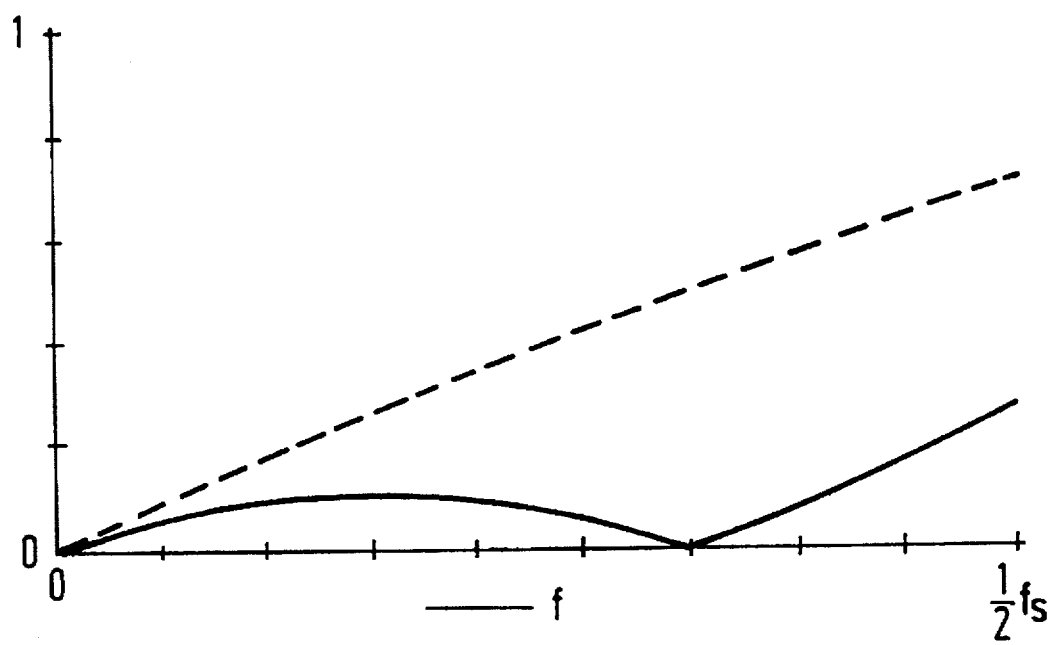
FIG. 3 shows the frequency response of remaining aliasing components.

FIG. 3a shows filter responses for incoming frequencies within the range from ½ fs to fs. The dashed curve represents the response when a single optical filter element with a frequency dip at the sampling frequency fs is used. The drawn curve represents the response of the combination of two optical filter elements according to the invention with respective frequency dips at the sampling frequency and at two thirds of the sampling frequency.

Figure 3B:
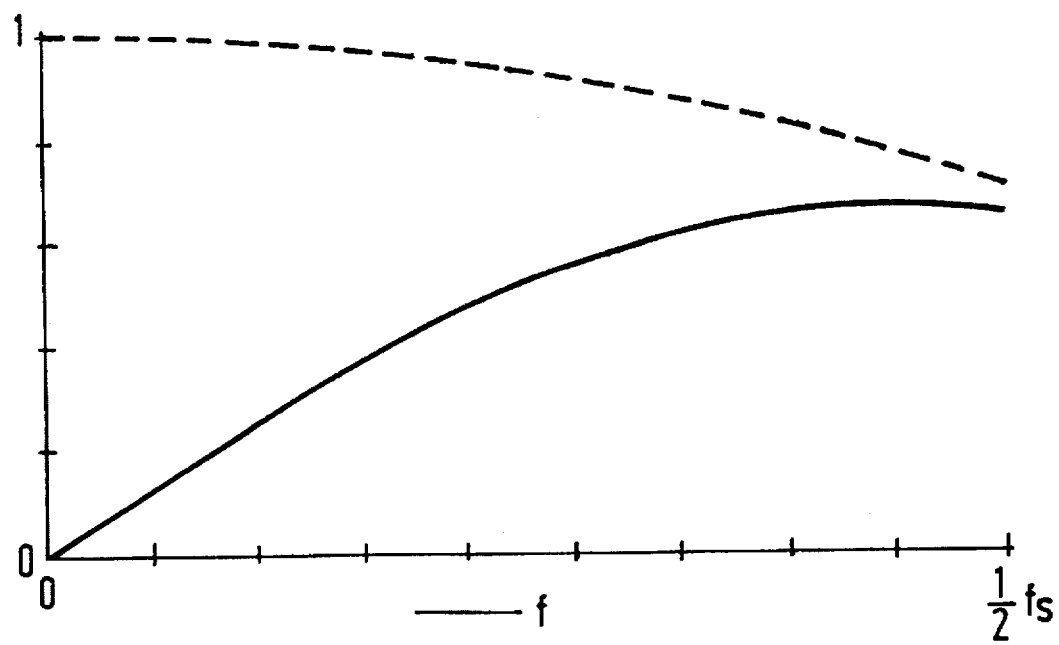

FIG. 3b shows filter responses for incoming frequencies within the range from ⅔*fs to 2*fs. The dashed curve represents the response when a single optical filter element with a frequency dip at the sampling frequency fs is used. The drawn curve represents the response of the combination of two optical filter elements according to the invention with respective frequency dips at the sampling frequency and at two thirds of the sampling frequency.

Ten possible embodiments of the optical low-pass filter according to the invention are given below.

1) A low-pass filter having a trap point at fs and horizontal separation, followed by a retardation plate, followed by a low-pass filter having a trap point at ⅔*fs and horizontal separation.

2) A low-pass filter having a trap point at ⅔*fs and horizontal separation, followed by a retardation plate, followed by a low-pass filter having a trap point at fs and horizontal separation.

3) A low-pass filter having a trap point at fs and horizontal separation, followed by a low-pass filter having a trap point at ⅔*fs and separation under 45°, followed by a low-pass filter having a trap point at ⅔*fs and separation under 135°.

4) A low-pass filter having a trap point at ⅔*fs and separation under 135°, followed by a low-pass filter having a trap point at ⅔*fs and separation under 45°, followed by a low-pass filter having a trap point at fs and horizontal separation.

5) A low-pass filter having a trap point at ⅔*fs and horizontal separation, followed by a low-pass filter having a trap point at fs and separation under 45°, followed by a low-pass filter having a trap point at fs and separation under 135°.

6) A low-pass filter having a trap point at fs and separation under 135°, followed by a low-pass filter having a trap point at fs and separation under 45°, followed by a low-pass filter having a trap point at ⅔*fs and horizontal separation.

7) A low-pass filter having a trap point at fs and horizontal separation, followed by a low-pass filter having a trap point at ⅔*fs and separation under 135°, followed by a low-pass filter having a trap point at ⅔*fs and separation under 45°.

8) A low-pass filter having a trap point at ⅔*fs and separation under 45°, followed by a low-pass filter having a trap point at ⅔*fs and separation under 135°, followed by a low-pass filter having a trap point at fs and horizontal separation.

9) A low-pass filter having a trap point at ⅔*fs and horizontal separation, followed by a low-pass filter having a trap point at fs and separation under 135°, followed by a low-pass filter having a trap point at fs and separation under 45°.

10) A low-pass filter having a trap point at fs and separation under 45°, followed by a low-pass filter having a trap point at fs and separation under 135°, followed by a low-pass filter having a trap point at ⅔*fs and horizontal separation.

The two angles in each embodiment may be both positive or both negative.

The relation between a shift $\delta$ in μm and the thickness t of the quartz crystal filter element in mm is given by the formula $\delta=5.91*t$.

The relation between the shift $\delta$ in μm and the dip frequency fd in line pairs lp per mm (lp/mm) is given by the formula $fd=1000/2\delta$, wherein the factor 1000 is required to convert μm to mm.

If a frequency dip is to be effected by the combination of two filter elements which have a direction of separation of 45° and 135°, respectively, in a direction clockwise or counterclockwise with respect to the horizontal scanning direction, the relation between the shift $\delta$ in μm and the dip frequency fd in line pairs lp per mm (lp/mm) is given by the formula $fd=1000/(2\delta*\sqrt{2})$, so that two pieces of quartz are required which are each $\sqrt{2}$ times thinner than the single piece of quartz which would be required for a filter with horizontal separation.

In one example, the optical filter arrangement 2 comprises a first optical filter element 11, a retardation element 12, a second optical filter element 13, and a second retardation element 14. The width of a pixel is 9 μm. The sampling frequency is 18 MHz. The first optical filter element 11 has a frequency dip at the sampling frequency 1*fs, which corresponds to 1*1000/9=111.11 lp/mm, so that the thickness should be 0.761 mm. The second optical filter element has a first frequency dip at ⅔*fs, which corresponds to ⅔*1000/9=74.07 lp/mm, so that the thickness should be 1.142 mm.

In another example, the optical filter arrangement 2 comprises a first optical filter element 11, a combination of a second and third optical filter element 12 and 13, and a retardation element 14. The width of a pixel is 9 μm. The sampling frequency is 18 MHz. The first optical filter element 11 has a frequency dip at the sampling frequency 1*fs, which corresponds to 1*1000/9=111.11 lp/mm, so that the thickness should be 0.761 mm. The second and third optical filter elements together provide a first frequency dip at ⅔*fs, which corresponds to ⅔*1000/9=74.07 lp/mm, so that their thicknesses should be 1.142/√2=0.806 mm.

It should be noted that the above-mentioned embodiments illustrate rather than limit the invention, and that those skilled in the art will be able to design many alternative embodiments without departing from the scope of the appended claims. The optical filter elements may be made from any suitable material, like calcite or quartz. It is not necessary that the optical filter elements are stacked one upon the other; there may be air layers between the optical filter elements. In the claims, any reference signs placed between parentheses shall not be construed as limiting the claim.

What is claimed is:

1. An optical low-pass filter arrangement comprising:

a first birefringent optical filter element for providing a frequency response with a frequency trap point at a sampling frequency (fs) of an image sensor (4R, 4G, 4B) to be arranged in an optical path including the optical low-pass filter arrangement and the image sensor (4R, 4G, 4B); and a second birefringent optical filter element for providing a frequency response with a first frequency trap point at two thirds of the sampling frequency (fs) of the image sensor (4R, 4G, 4B), and a second frequency trap point at twice the sampling frequency (fs) of the image sensor (4R, 4G, 4B).

2. A camera comprising:

an image sensor (4R, 4G, 4B) having a sampling frequency (fs); and an optical low-pass filter arrangement arranged in an optical path with the image sensor (4R, 4G, 4B), the optical low-pass filter arrangement comprising:

a first birefringent optical filter element for providing a frequency response with a frequency trap point at the sampling frequency (fs) of the image sensor (4R, 4G, 4B); and a second birefringent optical filter element for providing a frequency response with a first frequency trap point at two thirds of the sampling frequency (fs) of the image sensor (4R, 4G, 4B), and a second frequency trap point at twice the sampling frequency (fs) of the image sensor (4R, 4G, 4B).

3. The camera as claimed in claim 2, further comprising a colour separation system in the optical path between the optical low-pass filter arrangement and the image sensor (4R, 4G, 4B), wherein the optical low-pass filter arrangement further comprises a depolarisator between said first and second birefringent optical filter elements on the one hand, and said colour separation system on the other hand.

\* \* \* \* \*